Figure 1:
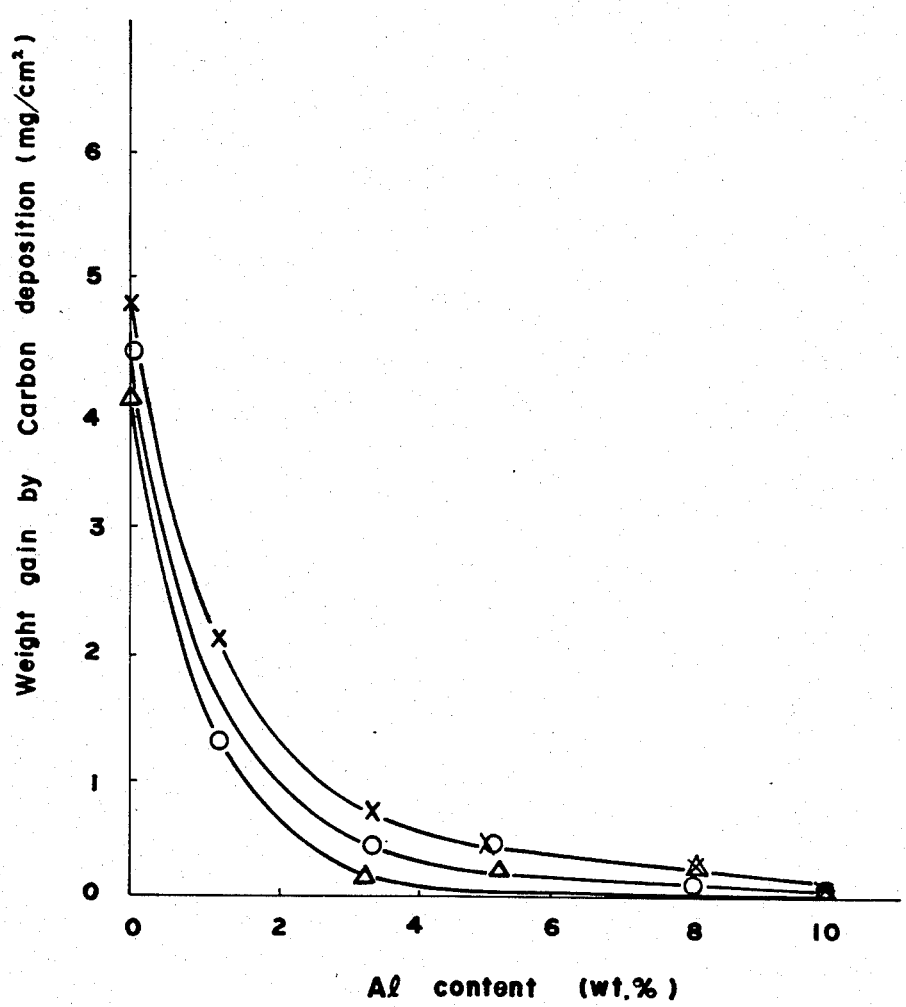

United States Patent [19]

Maeda et al.

[11] Patent Number: 4,532,109
[45] Date of Patent: Jul. 30, 1985

[54] PROCESS FOR PROVIDING AN APPARATUS FOR TREATING HYDROCARBONS OR THE LIKE AT HIGH TEMPERATURES SUBSTANTIALLY WITHOUT CARBON DEPOSITION

[75] Inventors: Keikichi Maeda; Takahiro Iijima, both of Yokohama, Japan

[73] Assignee: JGC Corporation, Tokyo, Japan

[21] Appl. No.: 575,049

[22] Filed: Jan. 30, 1984

Related U.S. Application Data

[63] Continuation of Ser. No. 341,214, Jan. 21, 1982, abandoned.

[51] Int. Cl.$^3$ .............................................. B01J 19/02
[52] U.S. Cl. ...................................... 422/240; 75/124; 75/126 R; 208/48 R; 585/950
[58] Field of Search .............. 422/150, 240, 241, 310; 48/213; 75/124 R; 585/950; 208/48 R

[56] References Cited

U.S. PATENT DOCUMENTS

| | | | |
|---|---|---|---|
| 2,339,368 | 1/1944 | Bagsar | 422/240 X |
| 2,393,778 | 1/1946 | Hull | 422/240 X |
| 2,448,462 | 8/1948 | Renzoni | 422/240 X |
| 3,149,176 | 9/1964 | Glazier et al. | 422/240 X |
| 3,505,028 | 4/1970 | Douthit | 422/241 X |
| 3,811,874 | 5/1974 | Caule et al. | 75/124 R |
| 3,827,967 | 8/1974 | Nap et al. | 208/48 R |
| 3,912,552 | 10/1975 | Schultz et al. | 75/124 R X |
| 4,297,150 | 10/1981 | Foster et al. | 208/48 R X |
| 4,343,658 | 8/1982 | Baker et al. | 422/241 X |

Primary Examiner—Richard L. Chiesa
Attorney, Agent, or Firm—Bucknam and Archer

[57] ABSTRACT

A process for providing an apparatus for treating hydrocarbons or the like fluids at a high temperature substantially without carbon deposition is described. At least portions of the apparatus which are to be contacted with the high temperature fluid, are made of a specific alloy containing 1–10% by weight of aluminum and, if desired, oxidized before or upon contact with the high temperature fluid to form an aluminum-containing oxide film.

4 Claims, 3 Drawing Figures

PROCESS FOR PROVIDING AN APPARATUS FOR TREATING HYDROCARBONS OR THE LIKE AT HIGH TEMPERATURES SUBSTANTIALLY WITHOUT CARBON DEPOSITION

This is a continuation of application Ser. No. 341,214, filed Jan. 21, 1982, now abandoned.

This invention relates to an apparatus for treating therein hydrocarbons, derivatives thereof or a fluid containing carbon monoxide at a high temperature while preventing the deposition of carbon in the apparatus. More particularly, it relates to such an apparatus which is capable of preventing carbon deposition when used in the pyrolysis of hydrocarbons or derivatives thereof in the presence or absence of steam as in an ethylene-producing apparatus, delayed coking apparatus or the like or when used in treating a carbon monoxide-containing fluid at a high temperature as in a synthetic gas-producing apparatus.

The conventional apparatus are made of austenitic steels, ferritic, steels, austenite-ferrite duplex phase steels, low-alloy steels or the like and they have to be frequently subjected to so-called decoking since carbon is deposited on the inside of the portion of the apparatus such as piping (particularly heating tubing in furnaces), towers and vessels whereby are caused operationally undesirable troubles such as an increase in $\Delta P$, a decrease in heating efficiency and the like. Such decoking is a bar to the stable operation of the apparatus and will consequently aggravate the operational economy of the process carried out by the apparatus and have various adverse effects on the component materials thereof.

There have heretofore been proposed some means for preventing carbon deposition in the aforesaid conventional apparatuses. For example, it was reported that carbon deposition may be inhibited to some extent by adding a minute amount of $H_2S$ to starting materials in an ethylene-producing apparatus [Ind. Eng. Chem. Proc.-Design and Development. 8 (1) (1969) 25 by B. L. Crynes and L. F. Albright]. This carbon deposition inhibiting method so reported is now carried out in some plants, however, it is practically not sufficiently effective when used in the production of ethylene or the like since the atmosphere inside pyrolysis tubes for said ethylene production is an oxidizing one. Further, in an attempt to find a material capable of preventing carbon deposition when the material is contacted with hydrocarbons or the like, various pure metals have hitherto been subjected to coking tests using light hydrocarbons on a laboratory scale; however, as far as the present inventors know, there are no metals having such a capability which are now used in actual industrial apparatuses concerned.

The inner side of the actual industrial apparatuses is covered with oxide scale. According to a report (Preprint for the 5th International Congress on Catalysis, Amsterdam (1972)) by Lobo et al., carbon deposition is caused by transition metals such as Fe and Ni and these metallic atoms always appear as if they float on the surface of the deposited carbon layer whereby the carbon deposition is continued. In fact, according to the present inventors' investigation, transition metals such as Fe and Ni were detected in coke by analyzing the coke deposited on the inner surface of the members of the apparatuses. Thus, it is presumed that the carbon deposition is due to the supply of transition metals such as Fe and Ni having diffused through the oxide layer formed on the inner surface of the members of the apparatuses.

An object of this invention is to provide an apparatus for treating therein hydrocarbons, derivatives thereof or a fluid containing carbon monoxide at a high temperature while preventing or remarkably reducing the deposition of carbon in the apparatus.

This and other objects of this invention will be apparent from the following description and accompanying drawings.

According to this invention, the portions of an apparatus which are to be contacted with a high-temperature fluid, are made of a specific alloy containing 1–10% by weight of Al (this alloy being hereinafter referred to simply as "specific alloy" for brevity). If desired, the specific alloy may be previously oxidized with an oxidizing gas prior to contact with the fluid or oxidized with the fluid proper or a diluting fluid such as steam immediately after contact with the fluid, thereby to form an oxide film on the surface of the specific alloy.

In this invention, the specific alloy may be prepared by having 1–10% by weight of aluminum (Al) contained in a base steel selected from, for example, austenitic steels, ferritic steels, austenite-ferrite duplex phase steels and low-alloy steels containing at least 5% by weight of chromium (Cr), after which the alloy so prepared is used as said apparatus portions to be contacted with the high-temperature fluid and, if desired, oxidized on the surface prior, or immediately subsequent, to contact therewith as mentioned above thereby to form an oxide film on the surface of the specific alloy.

The apparatuses contemplated by the present invention include a so-called ethylene producing apparatus in which naphtha, ethane, gas oil or the like, together with steam, at 750°–900° C. (the temperature of the fluid) is passed through the pyrolysis tubes provided in a heating furnace to produce lower unsaturated hydrocarbons such as ethylene and polypropylene, a bisbreaking apparatus in which an oil of heavy fraction is pyrolyzed, a delayed coking apparatus in which a residual oil obtained at the time of distillation at a reduced pressure is preliminarily heated within the heating tubes and then coked in a coking drum, an ethylbenzene dehydrogenating apparatus in which ethylbenzene is dehydrogenated in the presence of steam at a high temperature to produce styrene, a dealkylating apparatus in which various alkylbenzenes are dealkylated and a synthetic gas producing apparatus in which starting hydrocarbons (methane, LPG, naphtha, etc.) are incorporated with steam (oxygen is added in the case of a partially oxidizing method) and then heated to produce a synthetic gas composed of carbon monoxide and hydrogen. In summary, the apparatuses contemplated by the present invention are such that as mentioned above, they are used in treating a fluid such as hydrocarbons, derivatives thereof or any other fluid containing carbon monoxide at a high temperature and contain their portions, such as a heating furnace (pyrolysis furnace, reaction furnace and preheating furnace), transfer line, distillation column and heat exchanger, which are exposed to high temperatures during the operation of the apparatus and have heretofore raised problems as to carbon deposition (including so-called fouling which means clogging with deposited carbon throughout the specification).

The specific alloys which may be used as the material for the apparatus portions to be exposed to high temperatures substantially without carbon deposition, may be prepared by having 1–10% by weight of Al contained in the previously mentioned metallic material such as an austenitic or ferritic steel. The specific alloys are required to have suitable heat resistance, strength, weldability and the like for use in the apparatuses of the present invention, and should be selected depending upon the kind of a process carried out in the apparatus. For example, an alloy which may be used as the specific alloy in an ethylene producing apparatus is a material prepared by having Al contained in an austenitic heat resistant cast steel such as a 25%CR-20%Ni-0.4%C cast steel (HK 40) or a 25%Cr-35%Ni-0.5%C cast steel (HP). The specific alloys may be used in making up the apparatus portion in question.

If less than 1% by weight of Al is contained in the base steel, then the resulting alloyed steel will not form an oxide film enough to prevent carbon deposition on the surface when attempted to be oxidized, while if more than 10% by weight of Al is contained in the base steel, then the resulting alloyed steel will be lowered in high-temperature strength, castability, weldability and the like. The content of Al in the base steel may preferably be in the range of from 4.5 to 6.5% by weight. In addition, if Al is contained in a low chromium alloy containing less than 5% by weight of Cr, the resulting alloy will not exhibit remarkable inhibitive effects on carbon deposition; therefore, specific alloys should contain at least 5% by weight of Cr for use for the purpose of the present invention.

According to the present invention, as previously mentioned, there is manufactured an apparatus in which at least the portions to be contacted with a high-temperature fluid are made of the specific alloy and, if desired, oxidized to prevent carbon deposition when hydrocarbons, derivatives thereof or carbon monoxide-containing gases are treated at high temperatures in the apparatus.

The manner in which the oxide film is formed on the inner side of at least the apparatus portions to be contacted with the high-temperature fluid varies depending on the kind of a process carried out by the apparatus. For example, when a process system containing steam as the diluting or heating medium comes to be oxidizable at a high temperature for treating or reacting a fluid as in the pyrolysis tubes of an ethylene producing apparatus or the dehydrogenating reaction zone of an ethylbenzene dehydrogenating apparatus, the Al of the inner surface of the apparatus will be oxidized with said medium without need of other oxidation treatments after the treatment of the fluid or the start of reaction thereof since the medium is capable of oxidation at that high temperature, thereby to form a dense oxide film on the inner surface of the apparatus. If the high-temperature fluid is not or slightly capable of oxidizing the inner surface of the apparatus, the inner surface will be oxidized to form an Al-containing oxide film by preliminarily oxidizing the inner surface by a suitable means before the high-temperature fluid such as hydrocarbons is introduced into the process system or by passing a suitable amount of an oxidizing fluid through the inside of the apparatus before the treatment of the high-temperature fluid or the start of reaction thereof.

Thus, according to the present invention, an Al-containing oxide film is formed on the apparatus portions where carbon deposition will otherwise occur, and the oxide film so formed is extremely dense and durable and remains physically and chemically stable once formed whereby it covers the various transition metals in the apparatus portions and consequently prevents the migration of said metals to the surface of the film with the result that carbon deposition is prevented or remarkably reduced.

Accordingly, the present invention makes it possible to ensure a continuous operation of the apparatus without periodic decoking operations, obtain products of stable quality and dispense with surplus facilities and utilities for decoking, whereby a great reduction in the cost of overall equipment and economy of expense for decoking can be expected. In addition, the present invention is further advantageous in that $\Delta P$ is not raised thereby to ensure a sound operation of the apparatus, a fluid is surely heated to a desired temperature in the pipes of a heating furnace or the like without gradual raise in temperature of the outer surface of the pipes since there is eliminated an adiabatic action due to carbon deposition in the pipes, and economy of fuel may be expected.

This invention will be better understood by the following examples in which all the percentages and parts are by weight unless otherwise specified.

EXAMPLE 1

A 25%Cr-20%Ni-0.4%C centrifugal cast steel (HK-40), a 25%Cr-35%Ni-0.5%C centrifugal cast steel (HP-50) and an 18%Cr-8% Ni austenitic stainless steel (SUS 304) which were each a base steel, were incorporated with 1-10% of Al, melted in vacuo and cast in a metal mould to prepare Al-added test pieces. On the other hand, comparative test pieces (with no Al addition) were obtained by cutting out commercially available centrifugal cast pipes (HK-40 and HP-50) and commercially available plate (SUS 304). These test pieces so prepared or obtained were 4 mm × 10 mm × 45 mm in size and surface finished with an emery paper No. 120. The test pieces so treated were set at the center of the reaction tube of a laboratory coking equipment, while a feed gas (to be treated) and a carrier gas were introduced into the reaction tube at one end and withdrawn therefrom at the other end under the conditions as indicated below:

| | | |
|---|---|---|
| Feed gas | Benzene | 0.52 liq. cc/hr (ambient temperature) |
| Carrier gas | Steam | 16.0 N ml/min. |
| Reaction temp. and time | | 700° C. × 3 hr |

The results are as shown in FIG. 1 which indicates graphs showing the relationship between the Al content (wt.%) of the alloy and the amount (mg/cm$^2$) of carbon deposited on the surface thereof. In FIG. 1, the symbols o, × and Δ stand for the HK-40, HP-50 and SUS 304, respectively. The amounts of carbon deposited were calculated by dividing the weight gain (mg) of the test piece due to carbon deposition by the surface area (cm$^2$) of the test piece.

It is seen from FIG. 1 that the content of 1% of Al in the specific alloy will result in a remarkable decrease in amount of carbon deposited and the content of as high as about 4% of Al will result in substantially no carbon deposition.

EXAMPLE 2

A 25%Cr-20%Ni-0.4%C centrifugal cast steel (HK-40), a 25%Cr-35%Ni-0.5%C centrifugal cast steel (HP-50) and an 18%Cr-8%Ni austenitic stainless steel (SUS 304) which were each a base steel, were incorporated with 1-10% of Al, melted in vacuo and cast in a metal mould to prepare Al-added test pieces. On the other hand, comparative test pieces (with no Al addition) were obtained by cutting out commercially available centrifugal cast pipes (HK-40 and HP-50) and commercially available plate (SUS 304). These test pieces so prepared or obtained were 4 mm×10 mm×45 mm in size, surface finished with an emery paper No. 120, oxidized at 1100° C. for 1 hour in the atmosphere and allowed to cool thereby completing the pretreatment. The test pieces so pretreated were set at the center of the reaction tube of a laboratory coking equipment, while a feed gas (to be treated) and a carrier gas were introduced into the reaction tube at one end and withdrawn therefrom at the other end under the conditions as indicated below:

| Feed gas | Benzene | 0.52 liq. cc/hr (ambient temperature) |
| Carrier gas | Steam | 16.0 N ml/min. |
| Reaction temp. and time | | 700° C. × 3 hr |

Figure 2:
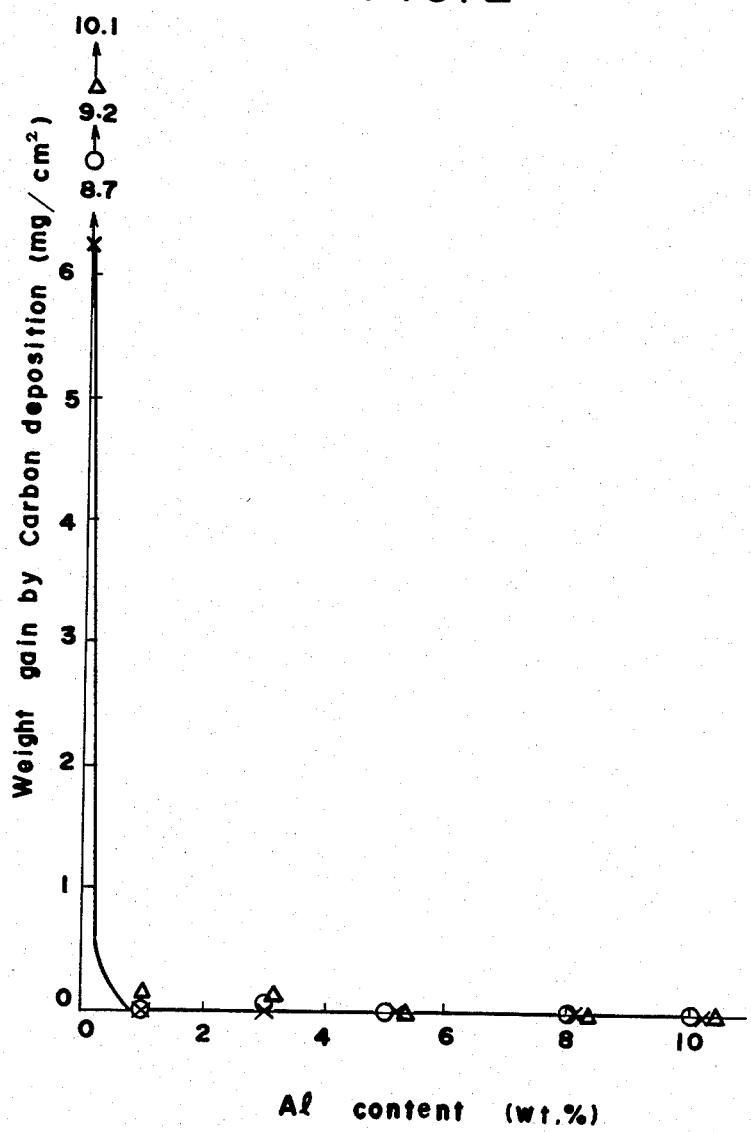

The results are as shown in FIG. 2 which indicates graphs showing the relationship between the Al content (wt.%) of the alloy and the amount (mg/cm$^2$) of carbon deposited on the surface thereof. In FIG. 2, the symbols o, × and Δ stand for the HK-40, HP-50 and SUS 304, respectively. The amounts of carbon deposited were calculated by dividing the weight gain (mg) of the test piece due to carbon deposition by the surface area (cm$^2$) of the test piece.

It is seen from FIG. 2 that the content of 1% of Al in the specific alloy will result in a remarkable decrease in amount of carbon deposited and the content of as high as about 4% of Al will result in substantially no carbon deosition.

EXAMPLE 3

SUS 405 (13%Cr) and STPA 25 (5%Cr-0.5%Mo) (each a ferritic steel) which were each a base steel, were incorporated with 1-10% of Al in the same manner as Example 2 to prepare Al-added test pieces. On the other hand, comparative test pieces (with no Al addition) were obtained by cutting out commerically available plate (SUS 405) and commercially available pipes (STPA 25). These test pieces so pepared or obtained were pretreated in the same manner as in Example 2 and then tested under the same conditions in the same apparatus as in Example 2.

Figure 3:
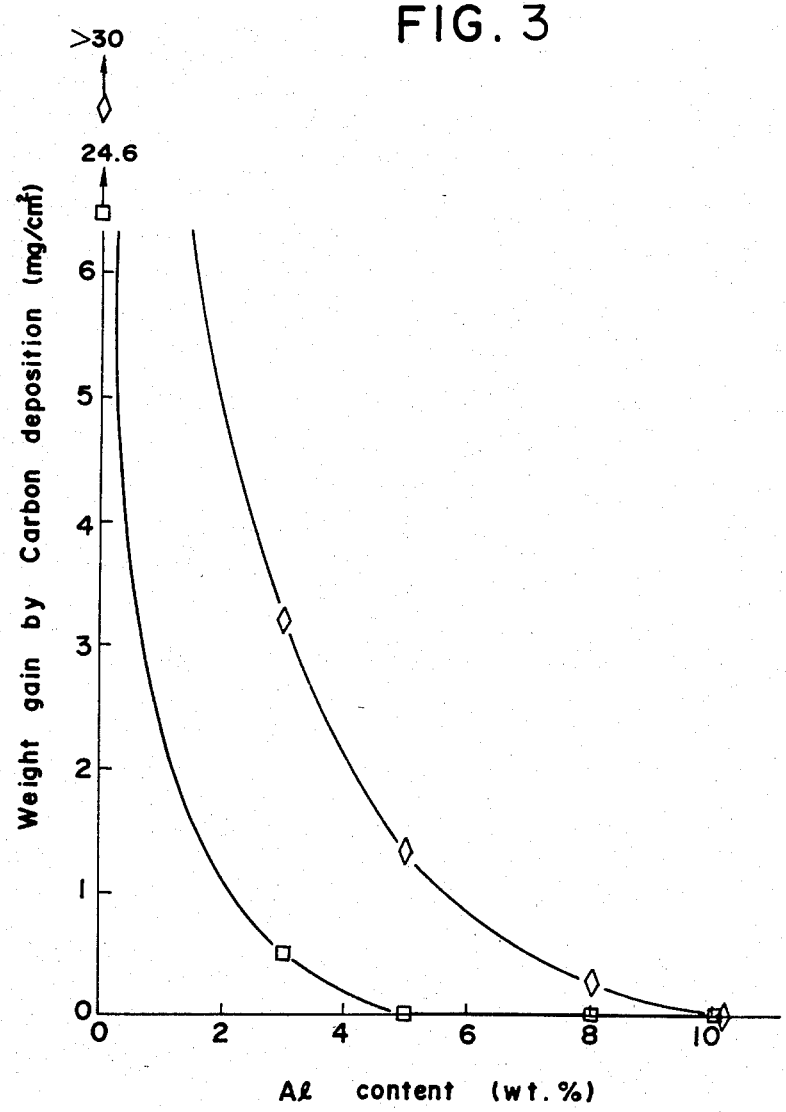

The results are as shown in FIG. 3 which indicates graphs showing the relationship between the Al content of the alloy and the amount of carbon deposited on the surface thereof. In FIG. 3, the symbols □ and stand for SUS 405 and STPA 25, respectively.

It is seen from FIG. 3 that the addition of Al to the base steel will result in a remarkable decrease in carbon deposition and that the content of 5% of Al in the base steel SUS 405 or the content of 10% of Al in the base steel STPA 25 will result in substantially no carbon deposition.

The same procedure of Example 2 was followed except that there were used test pieces made of each of low-alloy steels which were STPA 26 (7%Cr-0.5%Mo) and STPA 24 (2.25%Cr-1%Mo). The result is that STPA 26 exhibited the same effects as STPA 25 (5%Cr-0.5%Mo), while STPA 24 did not exhibit remarkable inhibitory effects on carbon deposition even when it contained Al in an amount of as high as 10%.

What is claimed is:

1. A method of protecting from carbon deposition an apparatus made of a base steel which has 5-25% chromium and 20-35% nickel, and preventing the migration of iron and nickel to the surface of the apparatus in which hydrocarbons, derivatives thereof or a carbon monoxide containing fluid are subjected to high temperature, which consists of: making at least the portions to be contacted with said hydrocarbons, derivatives thereof or with said high temperature fluid of a specific alloy base steel having 4.5-6.5% by weight of aluminum and at least 5% chromium and oxidizing said apparatus with an oxidizing gas before or upon contact with the said hydrocarbons, derivatives thereof or carbon monoxide containing fluids by heating to 1100° C. to form an aluminum-containing oxide film on the surface of at least said portions of the said apparatus and inhibiting carbon deposition on said portions of the apparatus.

2. The method according to claim 1 wherein the oxide film is formed with an oxidizing gas before contact with said hydrocarbons, derivatives thereof or said high temperature fluid.

3. The method according to claim 1 wherein the oxide film is formed with an oxidizing gas contained in the high temperature fluid upon contact therewith.

4. The method according to claim 1 wherein the base steel is a member selected from the group consisting of austenitic steels, ferritic steels, austenite-ferrite duplex phase steels and low alloy steels.

* * * * *